United States Patent [19]
Turner

[11] Patent Number: 5,134,548
[45] Date of Patent: * Jul. 28, 1992

[54] SNAP-IN LIQUID CRYSTAL DISPLAY BACKLIGHT ASSEMBLY

[75] Inventor: Winfield F. Turner, Greensboro, N.C.

[73] Assignee: Gilbarco, Inc., Greensboro, N.C.

[*] Notice: The portion of the term of this patent subsequent to Mar. 24, 2009 has been disclaimed.

[21] Appl. No.: 583,012

[22] Filed: Sep. 14, 1990

[51] Int. Cl.[5] .......................................... G01D 11/28
[52] U.S. Cl. ........................ 362/29; 362/23; 359/48
[58] Field of Search ............... 362/23, 29, 320, 346, 362/360, 370, 226, 16, 17, 18, 362, 364; 350/345, 48, 49, 50

[56] References Cited

U.S. PATENT DOCUMENTS

| | | | |
|---|---|---|---|
| 2,770,711 | 11/1956 | Baranowski | 362/29 |
| 3,659,093 | 4/1972 | Rieth | 362/366 |
| 3,957,351 | 5/1976 | Stockwell | 350/345 |
| 4,017,155 | 4/1977 | Yagi et al. | 350/345 |
| 4,122,524 | 10/1978 | McCrory et al. | 350/345 |
| 4,285,029 | 8/1981 | McCoy | 350/345 |
| 4,294,517 | 10/1981 | Jakubek | 359/48 |
| 4,357,061 | 11/1982 | Crosby | 350/336 |
| 4,410,949 | 10/1983 | Huellinghorst et al. | 364/465 |
| 4,460,942 | 7/1984 | Pizzuti et al. | 362/16 |
| 4,551,791 | 11/1985 | Salansky | 362/368 |
| 4,573,766 | 3/1986 | Bournay, Jr. et al. | 359/48 |
| 4,664,481 | 5/1987 | Ito et al. | 359/49 |
| 4,756,105 | 7/1988 | Wagner et al. | 350/334 |
| 4,768,300 | 9/1988 | Kutili | 40/541 |
| 4,770,499 | 9/1988 | Kobayashi et al. | 359/49 |
| 4,799,771 | 1/1989 | Taniguchi | 359/49 |
| 4,826,294 | 5/1989 | Imoto | 350/345 |
| 4,933,814 | 6/1990 | Sandi | 350/345 |
| 4,934,793 | 6/1990 | Klein | 350/345 |

FOREIGN PATENT DOCUMENTS

| | | | |
|---|---|---|---|
| 0194231 | 8/1988 | Japan | 359/48 |

Primary Examiner—Richard R. Cole
Attorney, Agent, or Firm—Rhodes, Coats & Bennett

[57] ABSTRACT

A backlight assembly for a liquid crystal display (LCD) supported on a printed circuit board with the pin sockets on either side of an opening in the printed circuit board so that the LCD straddles the opening. The assembly includes a snap-in reflector having a back wall and a plurality of forwardly extending peripheral walls which can be compressed to permit the backlight reflector to be inserted into the opening and released to hold it in position. A lamp in the backlight assembly shines light through the opening and through the LCD. The reflector has an inner surface that is highly reflective and non-specular, so that ambient light rays entering the front of the opening are captured and reflected forwardly back through the liquid crystal display.

26 Claims, 4 Drawing Sheets

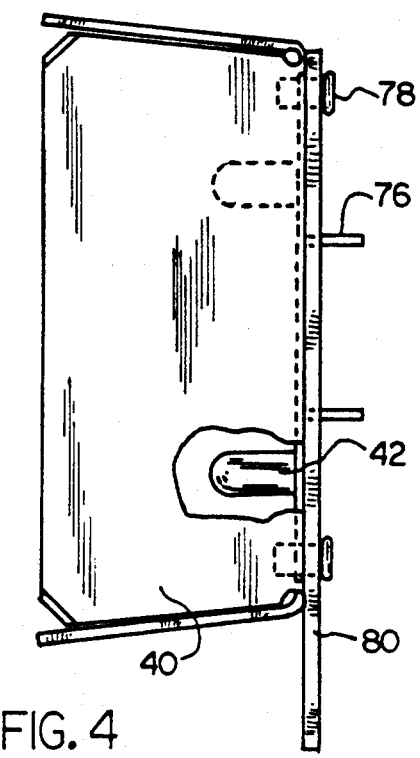
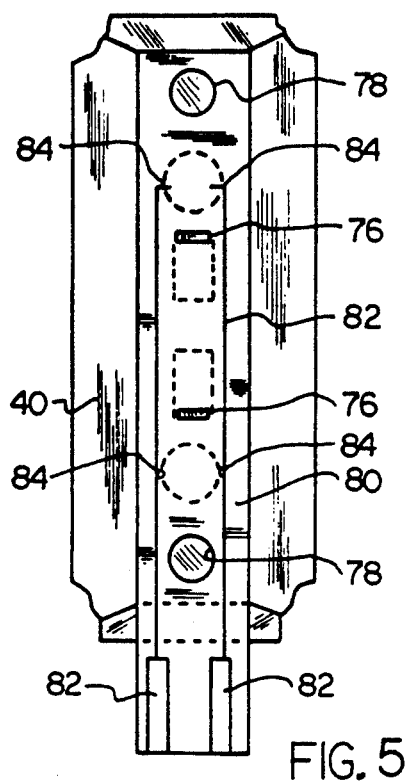
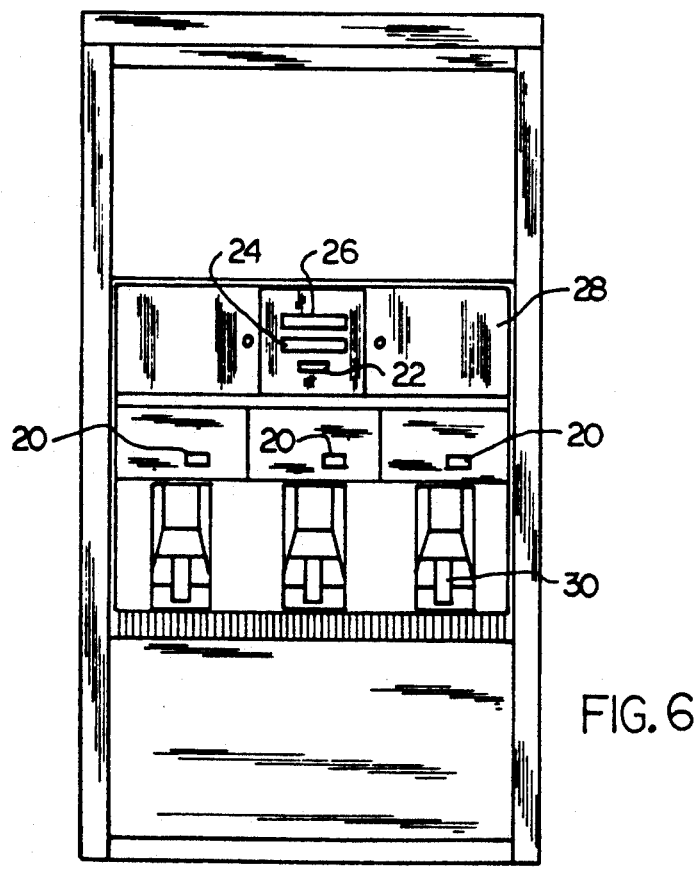

SNAP-IN LIQUID CRYSTAL DISPLAY BACKLIGHT ASSEMBLY

BACKGROUND OF THE INVENTION

The present invention relates to backlights for liquid crystal displays and preferably for liquid crystal displays as used, for example, in fuel dispensers. Liquid crystal displays are electronic devices having areas which can be modified in accordance with electrical signals input on pins to vary their light-transmissivity. This feature is used in various devices to visually display information for human interpretation. In order to function under all viewing conditions, however, a rear light source is required so that the variations in the transmissivity provided by the liquid crystal display (hereinafter "LCD") may be perceived.

Various devices for providing light to the rear of an LCD have been proposed, but none appear to provide the advantages of the present invention.

In particular, when installed in certain environments where light conditions vary, such as a gasoline dispenser, the light through the LCD must be fairly intense in order to be seen in worst case conditions. An incandescent light source is preferred because of cost factors, they require no ballast, and are compatible with various mounting schemes. Also a reflector is provided to maximize the effective use of the light emitted by the incandescent lamp.

However, incandescent lamps do have certain drawbacks including the generation of heat. Moreover, incandescent lamps are subject to more frequent failure, needing replacement. Accordingly, there is a need in the art for a snap-in, vented backlight assembly to assist in coping with these drawbacks.

SUMMARY OF THE INVENTION

The present invention fulfills this need in the art by providing a backlighting assembly for an indicia display housing which includes a board (printed circuit board) having front and rear sides supported by the housing with an opening in the board, an LCD on the front side of the board aligned with the opening and a snap-in backlight assembly. The backlight assembly includes a light source and a reflector. In order to provide the snap-in feature, the reflector is compressively secured in the opening so that light from the light source is directed through the opening and the LCD to display indicia to users of the fuel dispenser. In a preferred embodiment, the reflector has a back wall spaced from the opening and upper, lower and side walls which are inclined outwardly from the back wall to the opening. Preferably, the upper, lower and side walls are not attached to one another, but are integral with the back wall.

Replacement of the backlight assembly is made easy by virtue of the fact the reflector is compressively secured in the opening by outwardly urging forces exerted by the upper and lower walls. Preferably, the upper and lower walls have dog ears which project outwardly from the opening in the board on the front side of the board when the backlight assembly is installed on the board. The back wall is provided with an aperture to receive an incandescent lamp secured on a mounting means supported on the back wall, to serve as the light source. The mounting means may be in a suitable arrangement such as a rivet, fastener or a tab which projects from the back wall of the reflector through a hole in the board. Preferably, the reflector is provided with louvers to permit a cooling airflow through the display device.

In a preferred embodiment, the board has a pin socket on its front side, the LCD is supported by the pin sockets and an optical filter or other light modifier is positioned between the board and the LCD. Alternatively, the pins may be soldered to the board at appropriate points.

The invention further provides a method of installing a backlight to an LCD mounted on a printed circuit board having an opening in alignment with the LCD including the steps of providing a backlight having a lamp secured to a compressible reflector, compressing the reflector so that a portion of the reflector which is normally larger than the opening is made smaller than the opening, inserting the portion of the reflector into the opening and releasing the compression on the reflector so that the portion enlarges and engages the opening. Preferably, the providing step includes providing the reflector with notches and the inserting step includes locating the notches adjacent the opening in the board.

The invention further provides a backlight reflector for an LCD including a unitary piece of sheet material bent to form a back wall and a plurality of peripheral walls extending outwardly from the back wall to an open end, the peripheral walls including opposed stationary walls notched adjacent the open end and opposed deflectable walls having dog ears adjacent the open end. Preferably, the sheet material is steel.

Desirably, there are two of the stationary walls and two of the deflectable walls, the stationary walls having side edges substantially parallel with the deflectable walls and the deflectable walls may be deflected inwardly of the side edges of the stationary walls. Preferably, two of the peripheral walls are upper and lower walls, and the upper and lower walls are provided with louvered openings.

BRIEF DESCRIPTION OF THE DRAWING

The invention will be better understood by a review of the following detailed description along with a study of the drawings in which:

FIG. 4 is a top view of the reflector partially broken away with the light source installed;

FIG. 5 is a rear elevation view of the reflector with the light source installed;

FIG. 6 is an elevation view of a fuel dispenser provided with a multiplicity of LCD displays according to the present invention;

DETAILED DESCRIPTION OF THE PREFERRED EMBODIMENTS

Figure 1:
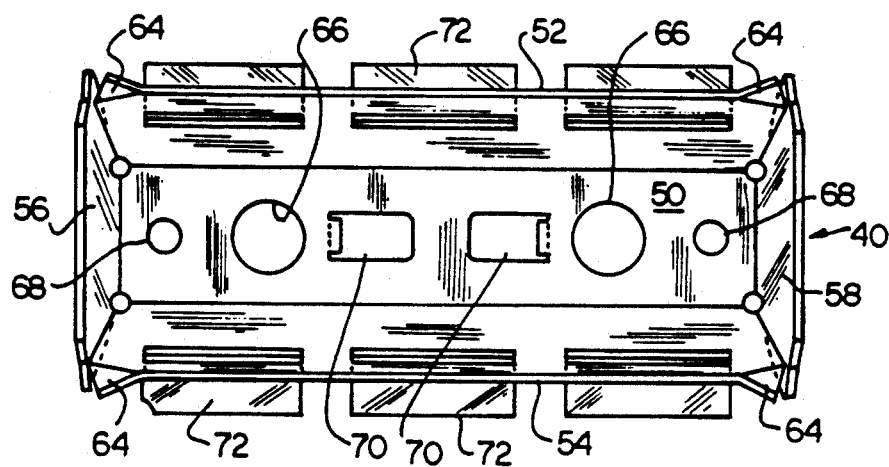
FIG. 1 is a front elevation view of a reflector for use in the present invention.

As can best be seen with reference to FIG. 6, a fuel dispenser housing 28 is provided with conventional fuel dispensing hoses and nozzles (not shown), the nozzles of which may be positioned on nozzle cradles 30. The housing is provided with read-outs to the customer. These include a price per gallon read-out 20 for each of three different grades of gasoline, a price per gallon read-out 22 for a selected grade of gasoline, and volume read-out 24 of the number of gallons in a particular transaction, and a total sale readout 26 indicating the amount due for a particular transaction. The present invention provides a means for making the various read-outs 20,22,24,26 of an LCD construction with effective backlighting.

The read-outs 20-26 are connected by conventional pin sockets to computation means of any desirable arrangement for providing the electronic signals to the LCD's of the read-outs to cause them to assume the transmissivity modes required to display the required information. The present invention focuses on providing suitable backlighting for these LCD displays to make the displayed information visible to a user of the fuel dispenser.

Figure 3:
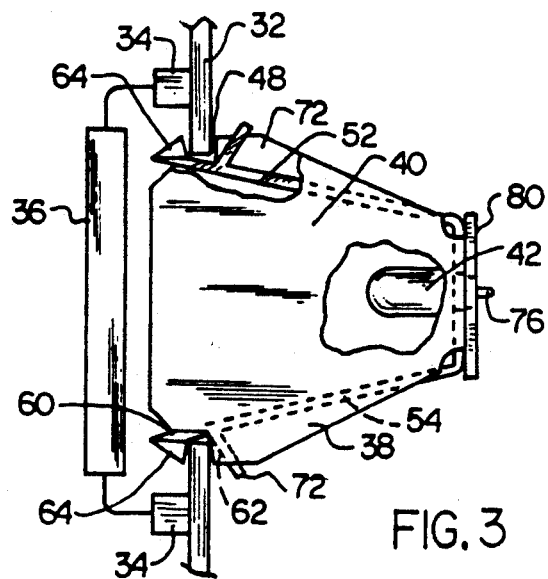
FIG. 3 is side elevation view partially broken away of the reflector of FIG. 1 as installed with a light source and installed on a printed circuit board.

As seen in FIG. 3, a display PC board 32 is provided as part of the fuel dispenser housing 28, generally inwardly of the outer housing 28. In fact, the board 32 is usually mounted on a protective plastic lens (not shown) through which the read-out is visible.

The PC board 32 is provided with LCD mounting sockets 34 into which the pins of an LCD 36 are mounted in conventional fashion. It should be noted that the two LCD mounting sockets 34 are arrayed on opposite sides of an opening 48 in the PC board so that the LCD 36 straddles the opening when its two opposed sets of pins are mounted in the mounting sockets.

A backlight assembly 38 is provided to engage the opening 48 and includes a reflector 40, a backlight PC board 80, and an incandescent light bulb 42. While an incandescent lamp 42 is specified, it should be recognized that other types of light sources such as, for example, neon and LED are also contemplated.

Figure 2:
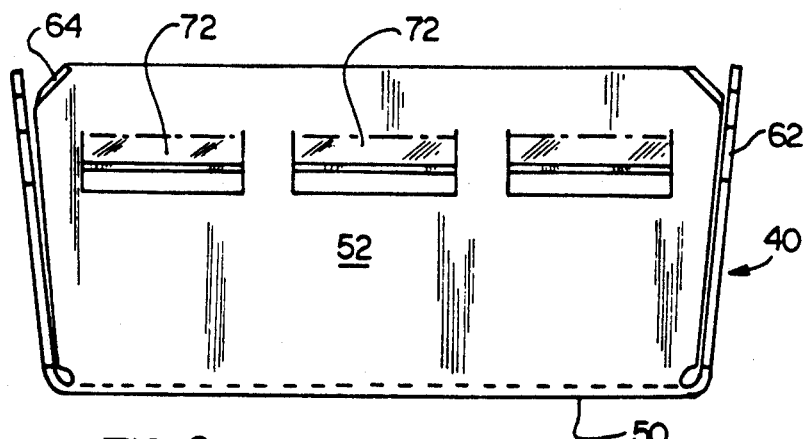
FIG. 2 is a top view of the reflector of FIG. 1.
Figure 7:
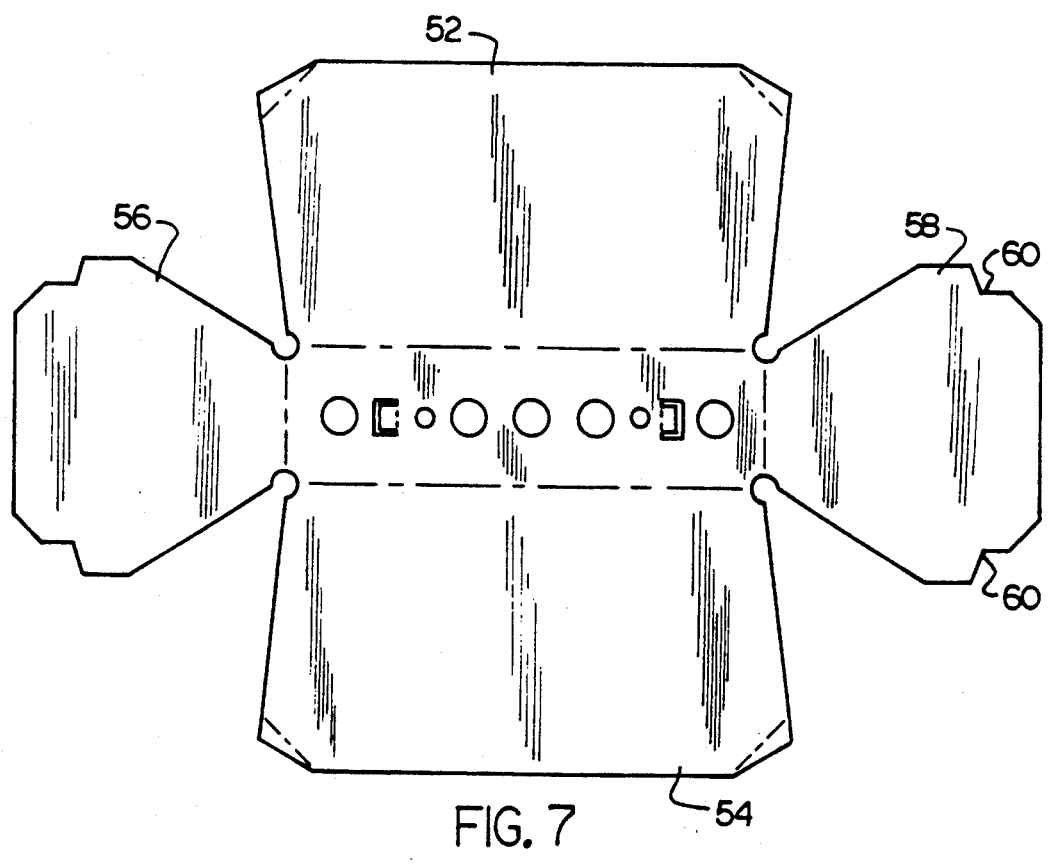
FIG. 7 is a plan view of a piece of sheet material adapted to be made into a reflector.

The reflector 40 is best seen in FIGS. 1 and 2. The reflector 40 is provided with a back wall 50, and upper wall 52, a lower wall 54, and side walls 56 and 58. Preferably, the reflector 40 is made of a piece of sheet material, such as thin steel and cut out with slots separating the upper, lower and side walls, followed by bending those walls into the position shown in FIGS. 1-3. A plan view of the sheet material before bending is shown in FIG. 7. Other materials including, but not limited to, aluminum, plastic or cardboard could be substituted. Also other methods of construction such as molding, and other shapes of reflectors, such as parabolic, might be employed without departing from the scope of the invention. As illustrated, upper wall 52, lower wall 54 and side walls 62 preferably incline outwardly and forwardly from back wall 50. So arranged, and because the inner surface of the reflector is highly reflective and non-specular, ambient light rays entering the front of opening 48 are captured and reflected forwardly through the liquid crystal display.

Referring again to FIG. 3, the side walls 56,58 are provided with notches 60 so that the reflector 40 may be installed in the opening 48 with a portion of the side walls 56,58 extending through the opening to the forward side of the PC board 32. The resulting shoulders 62 help to firmly position the side walls 56,58 properly against the back of the PC board surrounding opening 48.

The upper and lower walls 52,54 are provided with dog ears 64 which, as can be seen in FIG. 3, secure the reflector 40 against the PC board 32.

Since the upper walls 52,54 are provided inwardly of the side walls 56,58, such that the side edges of the side walls are somewhat parallel to the upper and lower walls, the upper and lower walls may be compressed inwardly. Such inward compression reduces the distance spanned by the dog ears 64 of the opposed upper wall 52 and lower wall 54 from their normal configuration and permits the dog eared edges of the upper and lower walls 52,54 to be inserted from the rear, forwardly through the opening 48. Release of such compression after such insertion permits the walls to open so that the dog ears are lodged forwardly of the PC board 32.

As can be seen in FIGS. 1, 2 and 3, the upper wall 52 and lower wall 54 are provided with louvers 72. The louvers 72 are formed by cutting out three sides of a tab, leaving a fourth side integral with the walls 52,54. These louvers are provided for ventilation purposes, as will be described further hereinafter.

Referring again to FIG. 1, the back wall 50 is provided with large openings 66, small openings 68, and voids 70 caused by lifted tabs 76. The large openings 66 are provided for the insertion from the rear of incandescent light sources.

FIGS. 5 and 6 illustrate the mounting of the incandescent lamps to the reflector 40. The lamps 42 are mounted first to a board 80 having conductors 82 formed thereon in conventional PC board fashion. The lamps 42 are desirably soldered at 84 to the conductors 82 to make electrical connections, but other connections may also be used. The lamps 42 extend through the holes 66 in the back wall 50, and the tabs 76 lifted out of the voids 70 in the back wall pass through cooperating holes in the PC board 80. Alternatively, rivets 78 can be provided through the board 80 and small openings 68 in the back wall 50. Other means of securing the board to the back wall may, of course, be substituted. The conductors 82 connect to edge connectors (not shown) as is conventional, whereby a power source supplies electrical power to the lamps 42. In the embodiment shown in FIGS. 4 and 5, the louvers 72 have been omitted for the sake of clarity. In addition, the notches 60 and dog ears 64 have been broken away in FIG. 5 for ease of illustration.

In operation, the apparatus shown in FIG. 5 is supplied from the factory equipped with fresh lamps 42, with the board 80 secured to a reflector 40 by means of rivets 78 or twisted tabs 76. When the lamps in a fuel dispenser housing 28 need replacement, the dispenser housing is opened so that access to the rear of PC board 32 may be had. The connector on the existing board 80 is disconnected, the upper and lower walls 52,54 are compressed to cause the dog ears 64 to clear the opening 48 and the backlight assembly 38 is withdrawn rearwardly. This assembly can be either disposed of or reconditioned, as desired. The fresh backlight assembly 38 is installed in place of the removed assembly by compressing its upper and lower walls 52,54 to cause the dog ears 64 to span a distance that will clear the opening 48. The fresh backlight assembly 38 is then inserted into the opening so that the shoulders 62 engage the back of the PC board 32 and the walls 52,50 are released so they spring outwardly toward the PC board 48. The edge connector is then connected to the conductors 82 to enable the lamps 42 to be illuminated as desired. Thus, when the lamp 42 burns out, it can be easily replaced by field personnel.

Heat Handling

As can be appreciated, the incandescent lamps 42 give off not only light but also heat and, it is known that LCD's 36 are subject to premature failure at high temperature. This is particularly true when a multiplicity of LCD backlights are provided, as the LCD's 20,22,24,26 are in the dispenser of FIG. 6. The problem is particularly acute for the upper ones 24,26 of the LCD's since heat from the lower LCD's 20,22 and other heat-generating components rises to their level.

Accordingly, in order to take away excess heat from the reflector assembly 38, ventilation ports in the form of louvers 72 are provided. The louvers 72 are provided as lifted tabs from the upper and lower side walls of generally horizontally elongated configuration spanning a majority of the width of the upper and lower walls. The louvers serve as chimneys, establishing a convection airflow in through the lower louvers and out through the upper louvers, thereby pulling in cooler air and discharging warmer air. It has been found in laboratory evaluations that the provision of these louvers can reduce the operating temperature of the LCD by about 6° C., a significant reduction which materially enhances the operating life of the LCD 36.

The particular louver arrangement shown is preferred in that the lifting of the louvers and leaving them attached at the forward edges causes the louver to be oriented to reflect light which might otherwise exit from the reflector assembly 38 back into the reflector assembly where it may be directed usefully through the opening 48. Completely removing the tab or connecting it by its rearward edge do not so advantageously reflect the light inward to the reflector.

Also, since the reflector is made of metal, it is a good conductor of heat, and heat from the reflector is conducted into the lifted louver 72 where it is exposed to the moving airflow. This heat can be conducted and/or radiated from the lifted louvers 72, further enhancing the cooling effect.

A further improvement in the reflector 40 to assist this effectiveness is to provide the interior of the reflectore of a white color to enhance its reflectivity and to provide its outer shell as dark as possible, preferably black, to increase its ability to radiate heat away from the reflector assembly.

The adverse effect of the incandescent lamp heating is thereby reduced to an acceptable level.

Light Modifying Panel

The light output from the incandescent lamp 42 generally spans a broad visible spectrum and it is often desirable to highlight the LCD by displaying it in a particular color. Accordingly, as seen in FIGS 8, 9, 10 and 11, various filter arrangements can be provided to restrict the light passing through the LCD 36 to a desired color. Also it may be desirable to improve the visibility of the LCD by reflecting ambient light rays back through the LCD.

Figure 8:
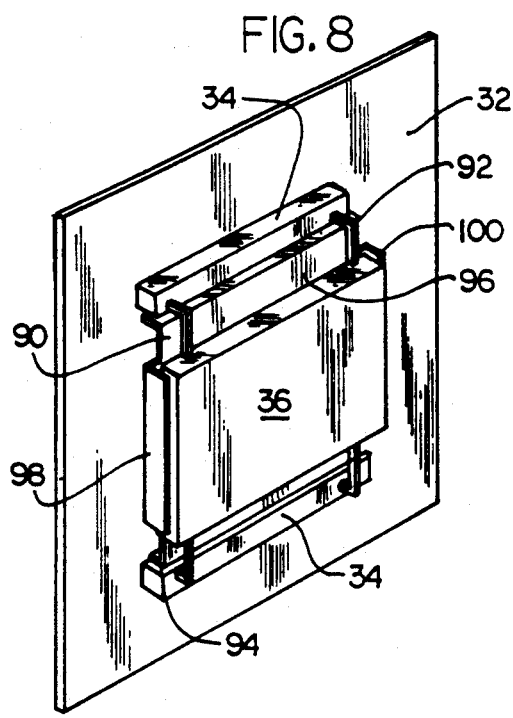
FIG. 8 is a front perspective view illustrating an LCD mounted on a printed circuit board and provided with an interposed filter.

As seen in FIG. 8, a view from the front side of the display, a light modifying panel 90 is interposed between the display board 32 and the LCD 36. The filter 90 is preferably a stiff sheet material such as polycarbonate. One source of such materials is Lexan, a product of GE Plastics, General Electric Company, Pittsfield, MA. Other filter materials may be substituted. The surface of panel 90 adjacent LCD 36 is provided with a coating that is light reflecting in addition to being light transmissive. The panel 90 is generally rectangular, but is also provided with downwardly turned upper and lower edges 92,94 which urge the main plane 96 of the panel into close proximity to the LCD 36. The upper edge 92 and lower edge 94 turn downward spaced from one another a distance slightly less than the internal distance between the pin sockets. Left and right edges 98,100 extend forwardly, just a bit wider than the LCD 36.

Thus, the panel is restrained against movement up or down by sockets 34 and restrained against movement left to right by LCD 36. Installation of this panel 90 requires removal of the LCD 36 from the pin sockets 34, placement of the filter between the sockets 34 and reinstallation of the LCD 36. It is important that the panel be retained snugly in place as close to the LCD as possible.

Figure 9:
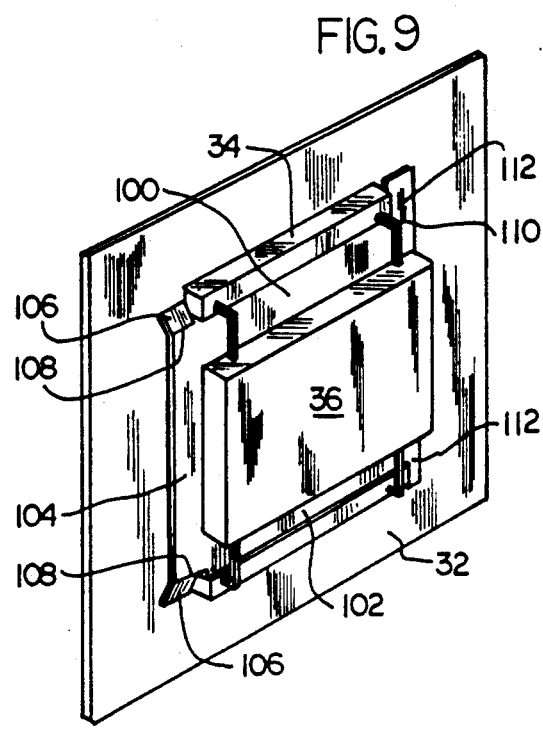
FIG. 9 is a view similar to FIG. 7, but with a different embodiment of the filter.

In the embodiment shown in FIG. 9, the panel 100 is provided largely in one plane with a mid-section 102. A leading end 104 has barbs 106 extending above and below the distance between the sockets 34, resiliently bent at 108. A trailing end 110 has similar tabs 112, but these are not resiliently bent. This embodiment can be installed without the need to remove the LCD 36 from the sockets 34. An old panel can be removed by bending in the tabs 106 and withdrawing the filter 100 to the right in the view of FIG. 8. A new filter may be installed by folding the tabs 106 on the leading end in place and prevent its withdrawal. As will be appreciated, the mid-section 102 can be provided with resiliently bent protrusions on its upper and lower edges, similar to barbs 106, to help to hold the panel 100 close to the LCD 36.

Figure 10:
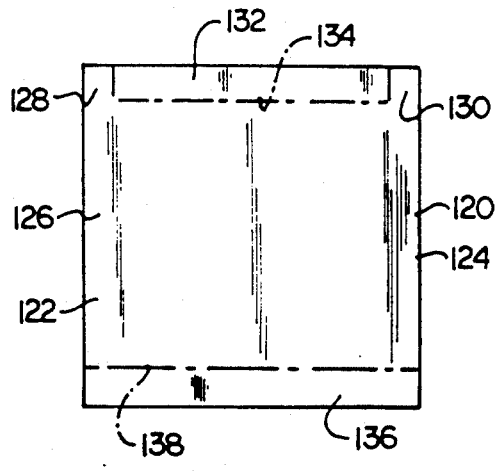
FIGS. 10 and 11 are schematic views of alternative filter embodiments.

An alternative embodiment is shown in FIG. 10, in which panel 120 is provided with a mid-section 122, a leading end 126, and a trailing end 124. The leading end 126 is provided with an upwardly extending tab 128, the mid-section 122 is provided with an upwardly extending flap 136 resiliently bent at 134 and the trailing end 124 is provided with a upwardly extending tab 130. The entire length of the panel 120 is provided with a lower flap 136 resiliently bent at 138. (Actually, in this embodiment, either end may function as the "leading" end.) The lower flap 136 is resiliently bent to narrow the width of the panel 120 for insertion between an LCD 36 and display board 32 until the tabs 128,130 extend past the end points of the upper socket 34, at which point the panel can move vertically to resiliently bend the flap 132 and cause the lower flap 136 to become somewhat less bent. Thus, the panel 120 is wedged between the upper and lower sockets 34 and held in place laterally by the tabs 128,130. As will be appreciated, the panel 120 could just as easily be inserted upside-down from that described hereinabove.

Figure 11:
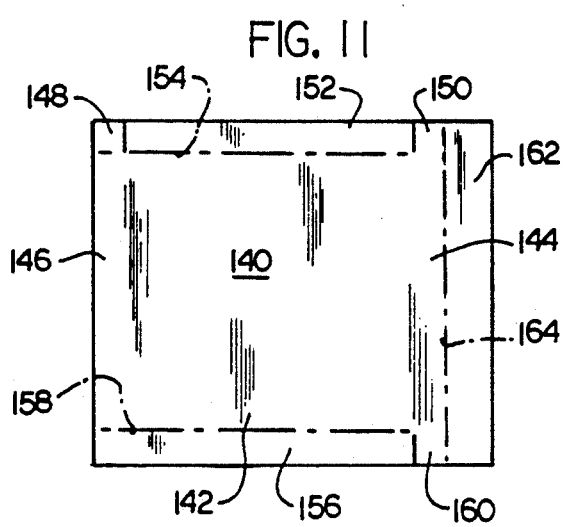

In the embodiment shown in FIG. 11, a panel 140 is provided with a mid-section 142, a leading end 146, and a trailing end 144. The leading end is provided with an upper tab 148, the mid-section is provided with a flap 152 resiliently bent at 154, and the trailing end 144 is provided with an upper tab 150 and lower tab 160. The remainder of the lower edge is provided with a lower flap 156 resiliently bent at 158. The lower tab 160 and upper tab 150 are generally coplanar with the upper tab 148 and mid-section 142, but a trailing flap 162 is downwardly bent at a resilient bend 164.

Installation of the panel in FIG. 11 involves bending the lower flap 156 inwardly to narrow the width of the panel, so that the filter may be inserted between the LCD 36 and the board 32 until tab 160 abuts the pin socket 34. Then, the lower flap 156 can be released outwardly, causing the tabs 148,150 to extend above the lower edge of the socket 34 and flap 152 to be bent downwardly. Thus, the tabs 148,150,160 will abut their respective sockets 34. Trailing flap 162 is provided to extend downwardly toward the display board 32 to filter light coming from that end of the opening before reaching the LCD 36. This embodiment is used in installations where the space available for the panel to extend laterally of the LCD 36 is restricted.

The light modifying panels have been described as being installed in a particular configuration, but it should be understood that other configurations may also be used. In particular, the as-described panels may be installed in different configurations including rotation of the filter, LCD and pin sockets by 90, 180 or 270 degrees, or other orientations. These arrangements permit the installation of a panel of a desired color with little difficulty. Such panels may be kept on hand by manufacturers of LCD display assemblies and installed as prescribed by a particular customer to fulfill color preferences.

Other embodiments of the invention from the specific embodiments disclosed herein will also come to mind to those of ordinary skill in the art falling within the scope of this invention.

What is claimed is:

1. An indicia display comprising:
   a printed circuit board having front and rear sides with an opening in said board,
   a liquid crystal display mounted on and supported by the front side of said board aligned with said opening,
   a backlight assembly including a light source and a reflector, said reflector being secured in said opening and supported by said board so that light from said light source is directed through said opening and said liquid crystal display to display indicia to viewers.

2. An indicia display as claimed in claim 1 wherein an inner surface of said reflector is so treated as to capture ambient light rays entering the front side of said openings and reflecting then through said liquid crystal display.

3. A fuel dispenser indicia display in a fuel dispenser housing comprising:
   a printed circuit board supported by said housing and having front and rear sides and an opening in said board;
   a liquid crystal display mounted on and supported by the front side of said board and aligned with said opening; and
   a backlight assembly including a light source and a reflector, said reflector being secured in said opening and supported by said board so that light from said light source is directed through said opening and said liquid crystal display indicia to users of the fuel dispenser.

4. An indicia display as claimed in claim 3 wherein an inner surface of said reflector is so treated as to capture ambient light rays entering the front side of said opening and reflecting them through said liquid crystal display.

5. A fuel dispenser indicia display in a fuel dispenser housing comprising:
   a printed circuit board supported by said housing and having front and rear sides and an opening in said board;
   a liquid crystal display on the front side of said board aligned with said opening; and
   a backlight assembly including a light source and a reflector, said reflector being secured in said opening so that light from said light source is directed through said opening and said liquid crystal display to display indicia to users of the fuel dispenser; and wherein said reflector has a back wall spaced from said opening and upper, lower and side walls which are inclined outwardly from said back wall to said opening.

6. An indicia display as claimed in claim 5 where in said upper, lower and side walls are not attached to one another but are integral with said back wall.

7. An indicia display as claimed in claim 6 wherein said reflector is compressively secured in said opening by outwardly urging forces created by said upper and lower walls.

8. An indicia display as claimed in claim 7 wherein said upper and lower walls have dog ears which project outwardly from said opening in said board on the front side of the board.

9. An indicia display as claimed in claim 5 wherein said back wall is provided with an aperture to receive said light source and said light source comprises an incandescent lamp secured on a mounting means supported on said back wall.

10. An indicia display as claimed in claim 9 wherein said mounting means comprises a rear board supported on said back wall by a fastener.

11. An indicia display as claimed in claim 9 wherein said mounting means comprises a rear board supported on said back wall by a tab projecting from said back wall through a hole in said rear board.

12. A fuel dispenser indicia display in a fuel dispenser housing comprising:
    a board supported by said housing and having front and rear sides and an opening in said board;
    a liquid crystal display on the front side of said board aligned with said opening;
    a backlight assembly including a light source and a reflector, said reflector being secured in said opening so that light from said light source is directed through said opening and said liquid crystal display to display indicia to users of the fuel dispenser; and wherein said board has a pin socket on its front side, said liquid crystal display is supported by said pin socket and an optical filter is positioned between said board and said liquid crystal display.

13. An indicia display comprising:
    a printed circuit board having front and rear sides with an opening in said board,
    a liquid crystal display on the front side of said board aligned with said opening,
    a backlight assembly including a light source and a reflector, said reflector being secured in said opening and said reflector having a back wall spaced from said opening and upper, lower and side walls which are inclined outwardly from said back wall to said opening, so that light from said light source is directed through said opening and said liquid crystal display to display indicia to viewers.

14. An indicia display as claimed in claim 13 where in said upper, lower and side walls are not attached to one another but are integral with said back wall.

15. An indicia display as claimed in claim 14 wherein said reflector is compressively secured in said opening by outwardly urging forces created by said upper and lower walls.

16. An indicia display as claimed in claim 15 wherein said upper and lower walls have dog ears which project outwardly from said opening in said board on the front side of the board.

17. An indicia display as claimed in claim 13 wherein said back wall is provided with an aperture to receive said light source and said light source is secured on a mounting means supported on said back wall.

18. An indicia display as claimed in claim 17 wherein said mounting means comprises a rear board supported on said back wall by a rivet.

19. An indicia display as claimed in claim 17 wherein said mounting means comprises a rear board supported on said back wall by a tab projecting from said back wall through a hole in said rear board.

20. An indicia display comprising:
a board having front and rear sides with an opening in said board, said board having a pin socket on its front side,
a liquid crystal display supported on the front side of said board by said pin socket aligned with said opening, an optical filter positioned between said board and said liquid crystal display, and a backlight assembly including a light source and a reflector, said reflector being secured in said opening so that light from said light source is directed through said opening and said liquid crystal display to display indicia to viewers.

21. A method of installing a backlight to a liquid crystal display mounted on a printed circuit board comprising the steps of:
providing the printed circuit board with an opening,
mounting the liquid crystal display in alignment with the opening,
providing a backlight having a lamp secured to a compressible reflector,
compressing the reflector so that a portion of the reflector which is normally larger than the opening is made smaller than the opening;
inserting the portion of the reflector into the opening, and
releasing the compression on the reflector so that the portion enlarges and engages the opening in the printed circuit board.

22. A method as claimed in claim 21 wherein said backlight providing step includes providing the reflector with notches and said inserting step includes locating the notches adjacent the opening in the board.

23. A snap-in backlight reflector for a liquid crystal display comprising a back wall and a plurality of peripheral walls extending outwardly from said back wall to an open end, said peripheral walls including opposed stationary walls notched adjacent said open end and opposed deflectable walls having dog ears adjacent said open end.

24. A reflector as claimed in claim 23 wherein said walls are formed of a unitary sheet material bent to form said back wall and a plurality of peripheral walls.

25. A reflector as claimed in claim 23 wherein there are two of said stationary walls and two of said deflectable walls, said stationary walls having side edges substantially parallel with said deflectable walls, and said deflectable walls may be deflected inwardly of said side edges and said stationary walls.

26. A reflector as claimed in claim 23 wherein two of said peripheral walls are upper and lower walls and said upper and lower walls are provided with louvered openings.

* * * * *

UNITED STATES PATENT AND TRADEMARK OFFICE
CERTIFICATE OF CORRECTION

PATENT NO.  : 5,134,548
DATED       : July 28, 1992
INVENTOR(S) : Winfield F. Turner It is certified that error appears in the above—identified patent and that said Letters Patent is hereby corrected as shown below:

In the claims, column 7, line 50, the word "then" should be changed to --them--

Signed and Sealed this

Twenty-first Day of September, 1993

Attest:

BRUCE LEHMAN

*Attesting Officer*     *Commissioner of Patents and Trademarks*